US010282557B1

(12) United States Patent
Pore et al.

(10) Patent No.: US 10,282,557 B1
(45) Date of Patent: May 7, 2019

(54) SYSTEMS AND METHODS FOR PROTECTING SENSITIVE DATA AGAINST DATA LOSS

(71) Applicant: Veritas Technologies LLC, Mountain View, CA (US)

(72) Inventors: Jitendra Pore, Pune (IN); Neha Kamat, Mumbai (IN); Harshit Shah, Borivali West Mumbai (IN)

(73) Assignee: Veritas Technologies LLC, Santa Clara, CA (US)

( * ) Notice: Subject to any disclaimer, the term of this patent is extended or adjusted under 35 U.S.C. 154(b) by 324 days.

(21) Appl. No.: 14/946,407

(22) Filed: Nov. 19, 2015

(51) Int. Cl.
*G06F 21/62* (2013.01)
*H04L 29/06* (2006.01)

(52) U.S. Cl.
CPC ........ *G06F 21/6245* (2013.01); *H04L 63/102* (2013.01)

(58) Field of Classification Search
CPC .................................................. G06F 21/6245
See application file for complete search history.

(56) References Cited

U.S. PATENT DOCUMENTS

| 2007/0014536 A1* | 1/2007 | Hellman | G11B 27/034 386/259 |
| 2007/0219910 A1* | 9/2007 | Martinez | G06F 21/10 705/51 |
| 2016/0014154 A1* | 1/2016 | Huang | H04L 63/20 726/1 |
| 2016/0277374 A1* | 9/2016 | Reid | H04L 63/061 |
| 2017/0078322 A1* | 3/2017 | Seiver | H04L 43/0876 |

OTHER PUBLICATIONS

Margaret Rouse; unstructured data; http://searchbusinessanalytics.techtarget.com/definition/unstructured-data, as accessed Sep. 11, 2015; (Apr. 2010).
Newsroom—Your resource for the latest Symantec news; Symantec in the News; http://www.symantec.com/about/news/release/article.jsp?prid=20101215_01, as accessed Sep. 11, 2015; (on or before Sep. 11, 2015).
NTFS Permissions; https://www.idp.net/NTFS/, as accessed Sep. 11, 2015; (Nov. 1, 2012).

(Continued)

*Primary Examiner* — Simon P Kanaan
(74) *Attorney, Agent, or Firm* — FisherBroyles, LLP (57) ABSTRACT

The disclosed computer-implemented method for protecting sensitive data against data loss may include (1) identifying a resource comprising sensitive data, (2) establishing, for the resource, an accessibility threshold that indicates a limit on permissions to access the resource, (3) monitoring how the permissions to access the resource drift over time by tracking changes in users' permissions to access the resource, (4) detecting, while tracking the changes in users' permissions to access the resource, that access to the resource has surpassed the accessibility threshold, and (5) in response to detecting that the access to the resource has surpassed the accessibility threshold, performing a security action to protect the sensitive data from potentially being exposed. Various other methods, systems, and computer-readable media are also disclosed.

20 Claims, 7 Drawing Sheets

(56) References Cited

OTHER PUBLICATIONS

Symantec™ Data Insight—Intelligence into unstructured data ownership and usage; Data Sheet: Storage Management; http://eval.symantec.com/mktginfo/enterprise/fact_sheets/b-symc_data_insight_DS_21161621-2.en-us.pdf, as accessed Sep. 11, 2016; (Mar. 2012).
Data Insight—Unstructured data governance; Unstructured data analytics; http://www.symantec.com/en/uk/data-insight/ and https://www.veritas.com/product/information-governance/data-insight, as accessed Sep. 11, 2016; (Apr. 20, 2012).
Symantec™ Data Loss Prevention Data Insight Enterprise; Data Sheet: Data Loss Prevention; https://www.veritas.com/content/dam/Veritas/docs/data-sheets/data_insight_enterprise_DS_21005381.en.pdf, as accessed Sep. 11, 2015; (Jun. 2011).

\* cited by examiner

Tracking Data Structure
400

RESOURCE: 208

| DATE: | USERS WITH PERMISSION TO READ: | USERS WITH PERMISSION TO MODIFY: | USERS WITH PERMISSION TO MANAGE: | TOTAL USERS WITH PERMISSION TO ACCESS: |
|---|---|---|---|---|
| 10/1/2015 | 5 | 5 | 2 | 12 |
| 10/2/2015 | 10 | 3 | 2 | 15 |
| 10/3/2015 | 5 | 7 | 2 | 14 |
| 10/4/2015 | 5 | 10 | 2 | 17 |
| 10/5/2015 | 20 | 10 | 4 | 34 |
| 10/6/2015 | 20 | 15 | 4 | 39 |
| 10/7/2015 | 15 | 20 | 3 | 38 |
| 10/8/2015 | 10 | 20 | 7 | 37 |

SYSTEMS AND METHODS FOR PROTECTING SENSITIVE DATA AGAINST DATA LOSS

BACKGROUND

The ease with which digital information may be disseminated may create challenges for organizations concerned with preventing the loss of sensitive data. Preventing data loss may be especially challenging for organizations managing a hefty number of employees with access to the organization's resources. For such organizations, merely identifying which users have permission to access which resources may be an enormous undertaking. This may be especially true with regards to unstructured data resources.

To make matters more challenging, user permissions for a particular resource may change overtime. Thus, a trifling number of users may have permission to access a resource at an initial point in time, but, as time progresses, the number may increase until the number becomes large enough to pose a security risk. In such a case, an organization that identifies only the initial number may be left unaware of the developing security risk. The instant application, therefore, identifies the need for improved systems and methods for managing user permissions to avoid data loss.

SUMMARY

As will be described in greater detail below, the instant disclosure describes various systems and methods for protecting sensitive data against data loss. In one example, a computer-implemented method for protecting sensitive data against data loss may include (1) identifying a resource including sensitive data, (2) establishing, for the resource, an accessibility threshold that indicates a limit on permissions to access the resource, (3) monitoring how the permissions to access the resource drift over time by tracking changes in users' permissions to access the resource, (4) detecting, while tracking the changes in users' permissions to access the resource, that access to the resource has surpassed the accessibility threshold, and (5) in response to detecting that the access to the resource has surpassed the accessibility threshold, performing a security action to protect the sensitive data from potentially being exposed.

In some examples, establishing the accessibility threshold may include indicating that the security action will be triggered if a current number of users with permission to access the resource surpasses a predefined baseline number by more than a threshold amount. In one embodiment, the threshold amount may include a predefined percentage of the baseline number. In this embodiment, tracking the changes in users' permissions may include (1) identifying a number of users with permission to access the resource at a current moment in time, (2) calculating a percentage difference between the baseline number and the number of users with permission to access the resource at the current moment in time, and (3) determining that the calculated percentage difference exceeds the threshold amount.

In some examples, the baseline number may include a number selected by a user. Additionally or alternatively, the baseline number may include a number of users with permission to access the resource at the time the accessibility threshold is established.

In one embodiment, tracking the changes in users' permissions to access the resource may include tracking only instances in which a number of users with permission to access the resource increases. Additionally or alternatively, tracking the changes in users' permissions to access the resource may include tracking changes in (1) users' permission to read the resource, (2) users' permission to modify the resource, and/or (3) users' permission to perform management functions for the resource.

In some examples, the method may detect that access to the resource has surpassed the accessibility threshold by determining that a current number of users with (1) permission to read the resource, (2) permission to modify the resource, and/or (3) permission to perform management functions for the resource has surpassed the accessibility threshold. Additionally or alternatively, the method may detect that access to the resource has surpassed the accessibility threshold by determining that a combination of two or more of (1) the current number of users with permission to read the resource, (2) the current number of users with permission to modify the resource, or (3) the current number of users with permission to perform management functions for the resource have surpassed the accessibility threshold.

In one embodiment, performing the security action may include sending (e.g., to an administrator that manages security of the resource) an alert indicating that the resource is potentially at risk of being exposed. Additionally or alternatively, performing the security action may include blocking one or more users' access to the resource, revoking one or more users' access to the resource, and/or limiting one or more users' access to the resource.

In some examples, the method may further include scanning an enterprise's unstructured data for resources including sensitive information. In these examples, the method may include identifying the resource as a result of the scanning. In one example, monitoring how the permissions to access the resource drift over time may include monitoring changes made to an active directory.

In one embodiment, a system for implementing the above-described method may include an identification module, stored in memory, that identifies a resource including sensitive data and a threshold module, stored in memory, that establishes, for the resource, an accessibility threshold that indicates a limit on permissions to access the resource. The system may also include a monitoring module, stored in memory, that (1) monitors how the permissions to access the resource drift over time by tracking changes in users' permissions to access the resource and (2) detects, while tracking the changes in users' permissions to access the resource, that access to the resource has surpassed the accessibility threshold. The system may also include a security module that, in response to the detection, performs a security action to protect the sensitive data from potentially being exposed and may further include a physical processor configured to execute the identification module, the threshold module, the monitoring module, and the detection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a resource including sensitive data, (2) establish, for the resource, an accessibility threshold that indicates a limit on permissions to access the resource, (3) monitor how the permissions to access the resource drift over time by tracking changes in users' permissions to access the resource, (4) detect, while tracking the changes in users' permissions to access the resource, that access to the resource has surpassed the accessibility threshold, and (5) in response to the detection, perform a security action to protect the sensitive data from potentially being exposed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting an organization's sensitive data against data loss by improving the organization's data governance. As will be explained in greater detail below, the disclosed systems and methods may enable software-defined monitoring of changes in the number of users within an organization who have permission to access a resource. This monitoring may allow organizations to identify permission drift (e.g., gradual increases in the number of users with permission to access a resource) that may be caused by changes in permission and/or group membership changes. An increase in the number of users with permission to access a resource may also increase the risk that one of the users will expose the sensitive data. Thus, by identifying permission drifts, potential security risks created by the permission drifts may also be identified.

For example, in some embodiments, only a small number of users may have permission to access a resource at the time the resource is created or added to a system. This number may be small enough to pose only a trivial risk of data loss. However, over time, the number of users with permission to access the resource may gradually increase until the number becomes substantial enough to pose a significant security risk. By identifying the increase that occurred gradually over time, the potential security risk resulting from the gradual, yet substantial, increase may be identified and responded to.

Figure 1:
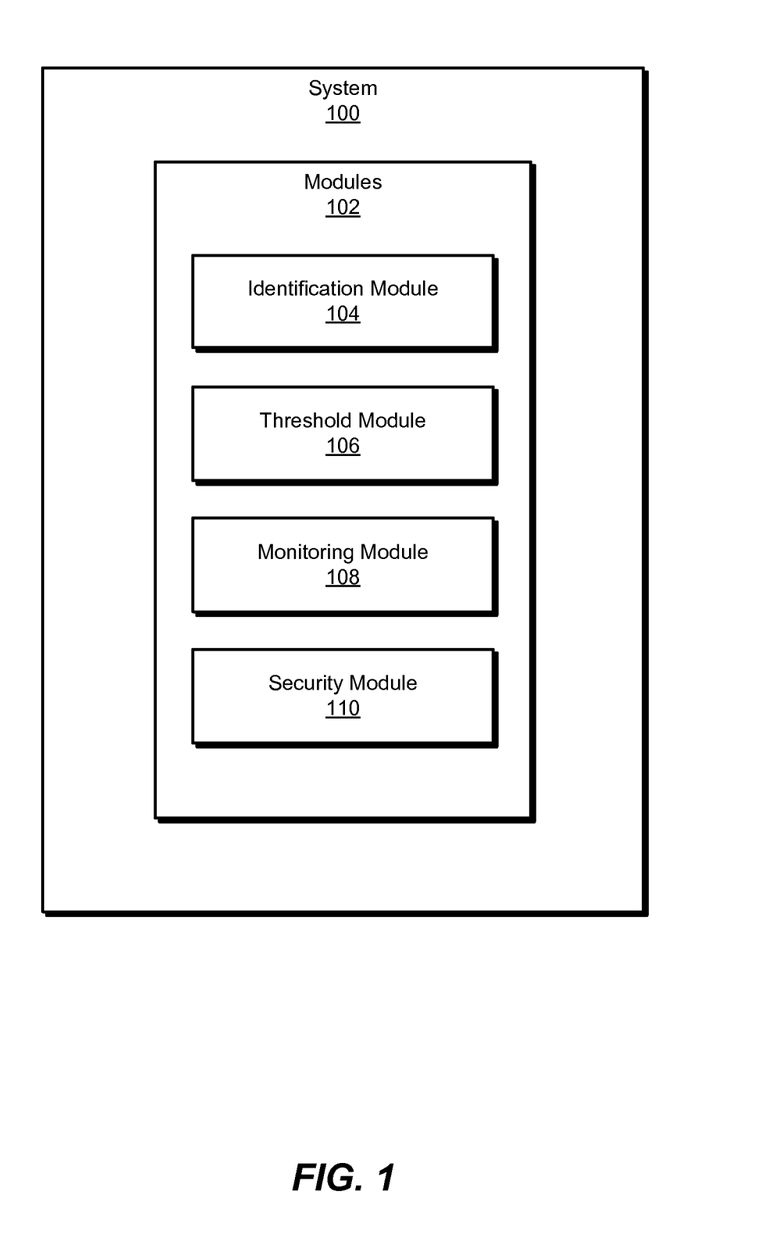
FIG. 1 is a block diagram of an exemplary system for protecting sensitive data against data loss.
Figure 2:
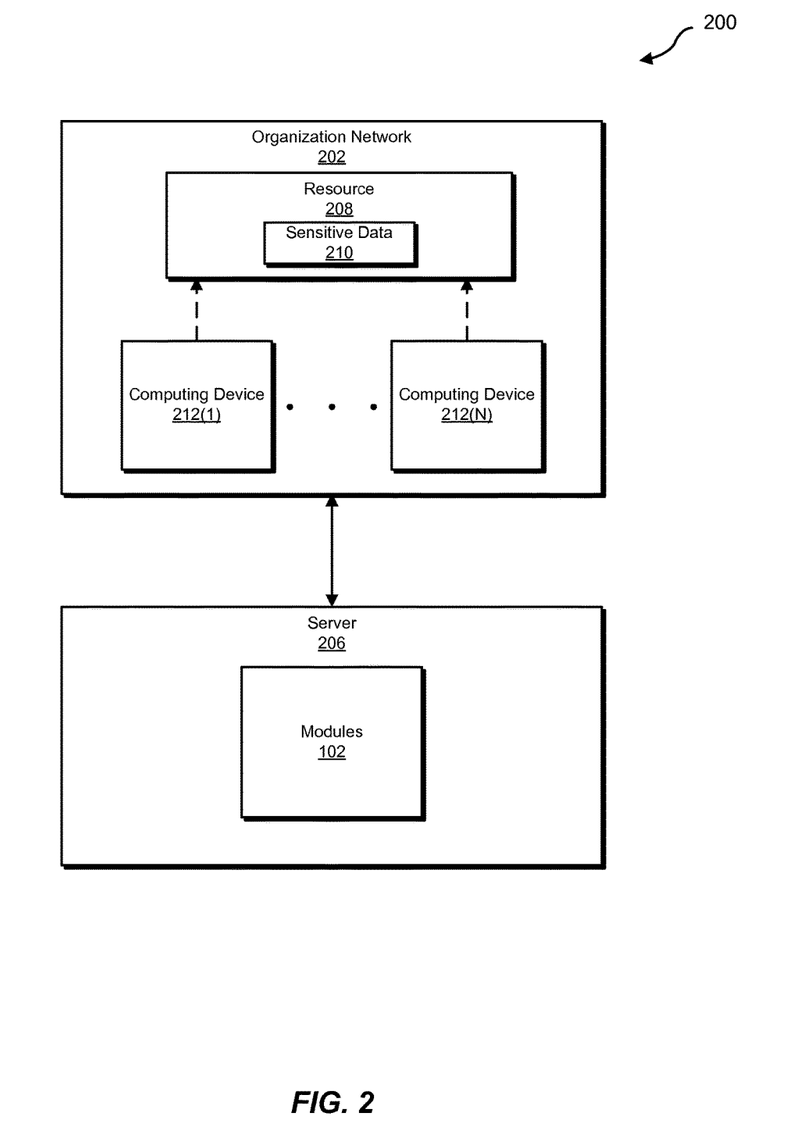
FIG. 2 is a block diagram of an additional exemplary system for protecting sensitive data against data loss.

The following will provide, with reference to FIGS. 1-2, detailed descriptions of exemplary systems for protecting sensitive data against data loss. Detailed descriptions of corresponding computer-implemented methods will also be provided in connection with FIG. 3. In addition, the disclosure associated with FIG. 4 will provide an example of a tracking data structure for protecting against data loss. Also, the disclosure associated with FIG. 5 will provide exemplary threshold information used for protecting against data loss. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting sensitive data against data loss. As illustrated in this figure, exemplary system 100 may include one or more modules 102 for performing one or more tasks. For example, and as will be explained in greater detail below, exemplary system 100 may also include an identification module 104 that may identify a resource. Exemplary system 100 may additionally include a threshold module 106 that may establish, for the resource, an accessibility threshold that indicates a limit on permissions to access the resource. Exemplary system 100 may also include a monitoring module 108 that may monitor how the permissions to access the resource drift over time by tracking changes in users' permissions to access the resource. Monitoring module 108 may also detect, while tracking the changes in users' permissions to access the resource, that access to the resource has surpassed the accessibility threshold. Exemplary system 100 may also include a security module 110 that performs a security action to protect the sensitive data from potentially being exposed. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 206 and/or computing devices 212(1)-(N)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. System 200 may include an organization network 202 in communication with a server 206. As shown in FIG. 2, server 206 may be programmed with one or more of modules 102. Additionally or alternatively, computing devices 212(1)-(N) may be programmed with one or more of modules 102.

In one embodiment, one or more of modules 102 from FIG. 1 may, when executed by at least one processor of computing devices 212(1)-(N) and/or server 206, enable computing devices 212(1)-(N) and/or server 206 to protect sensitive data against data loss. For example, and as will be described in greater detail below, identification module 104 may identify a resource 208 that includes sensitive data 210. Threshold module 106 may establish, for resource 208, an accessibility threshold that indicates a limit on permissions to access resource 208. Monitoring module 108 may monitor how the permissions to access resource 208 drift over time by tracking changes in users' permissions to access resource 208. For example, monitoring module 108 may track changes in permissions for users associated with computing devices 212(1)-(N) to access resource 208. Monitoring module 108 may also detect, while tracking the changes in users' permissions to access resource 208, that access to resource 208 has surpassed the accessibility threshold. Based on this detection, security module 110 may perform a security action to protect sensitive data 210 from being exposed (e.g., from being exposed by users associated with computing devices 212(1)-(N)).

Organization network 202 generally represents any medium or architecture capable of facilitating communication or data transfer between devices within an organization (e.g., between computing devices 212(1)-(N)). Examples of organization network 202 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Organization network 202 may facilitate communication or data transfer using wireless or wired connections. In one embodiment, organization network 202 may facilitate communication between computing devices 212(1)-(N) and resource 208. In some examples, server 206 may operate within the organization corresponding to organization network 202. In this example, organization network 202 may facilitate communication between server 206 and resource 208. Additionally or alternatively, in this example, organization network 202 may facilitate communication between server 206 and computing devices 212(1)-(N).

Computing devices 212(1)-(N) generally represent any type or form of computing devices capable of reading computer-executable instructions. Examples of computing devices 212(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, computing devices 212(1)-(N) may represent computing devices that are owned and managed by an organization corresponding to organization network 202. Additionally or alternatively, computing devices 212(1)-(N) may represent personal computers of the organization's employees which the employees use to access the organization's data. In some examples, computing devices 212(1)-(N) may each correspond to a user that has permission to access resource 208.

Server 206 generally represents any type or form of computing device that is capable of monitoring user permissions for resources. Examples of server 206 include, without limitation, application servers and database servers configured to provide various database services and/or run certain software applications. In some examples, as discussed above, server 206 may operate as part of organization network 202. Additionally or alternatively, server 206 may operate as part of a remote third-party service. For example, server 206 may operate as part of a security service that offers data loss protection services for an organization associated with organization network 202.

Figure 3:
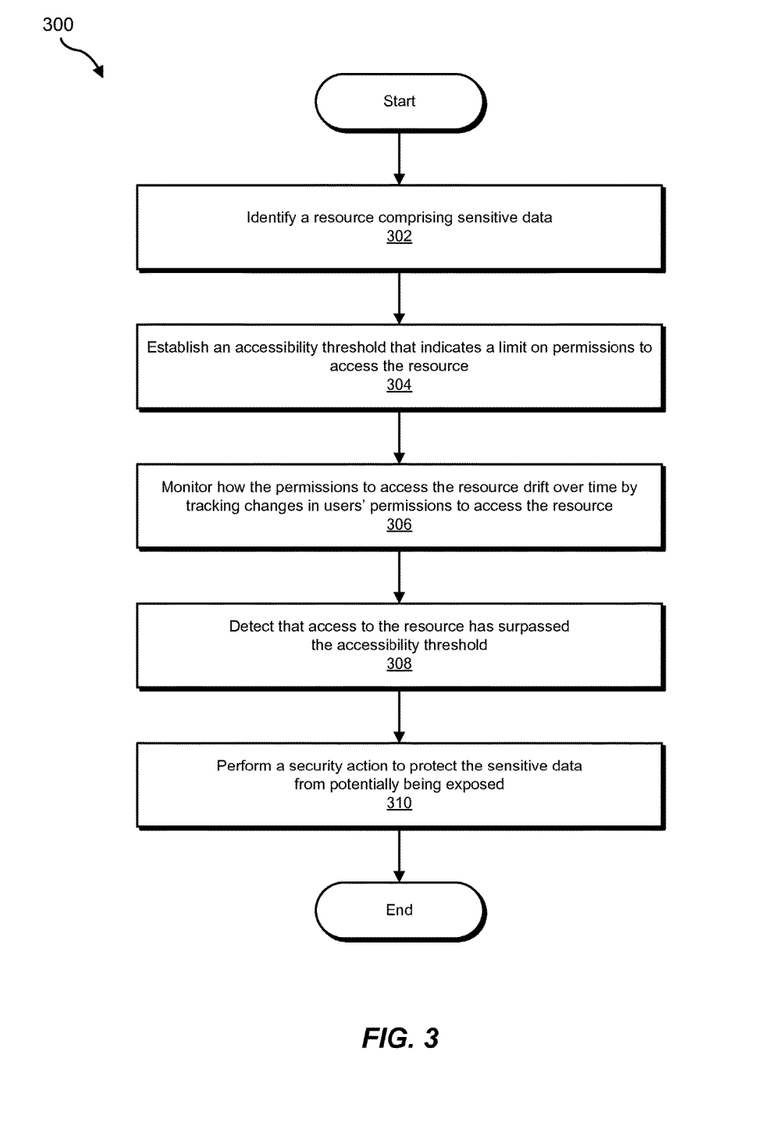
FIG. 3 is a flow diagram of an exemplary method for protecting sensitive data against data loss.

FIG. 3 is a flow diagram of an exemplary computer-implemented method 300 for protecting sensitive data against data loss. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a resource including sensitive data. For example, identification module 104 may, as part of server 206 in FIG. 2, identify resource 208 including sensitive data 210. The term "resource," as used herein, refers to any data item and/or collection of data items maintained by an organization. Examples of resources include, without limitation, word documents, spreadsheets, emails, multimedia files, PowerPoint presentations, and/or instant messages. The term "resource" may also refer to a group of files, such as a defined volume, a directory, and/or a list of files.

In some examples, the term "resource" may refer to an unstructured data item. The term "unstructured data," as used herein, generally refers to data that is stored by an organization but that does not have a pre-defined data model and/or is not organized in a pre-defined manner (e.g., data that is not contained in a defined data structure such as a database). Examples of unstructured data may include, without limitation, emails, documents, photos, videos, and/or spreadsheets that do not have a pre-defined data model and/or are not organized in a pre-defined manner.

The term "sensitive data," as used herein, refers to data that an organization intends to keep secret and/or to which the organization intends to restrict access. Examples of sensitive information may include, without limitation, confidential business information, financial information, intellectual-property information, patient information, credit-card information, and/or any other information and/or class of information determined to be sensitive by the disclosed systems and methods.

Identification module 104 may identify resource 208 in response to a variety of events. For example, identification module 104 may identify resource 208 when resource 208 is created. In this example, identification module 104 may identify resource 208 according to a policy that instructs identification module 104 to identify newly created resources.

In additional or alternative examples, identification module 104 may identify resource 208 in response to determining that resource 208 contains sensitive data (e.g., sensitive data 210). In these examples, identification module 104 may identify resource 208 according to a policy that instructs identification module 104 to identify resources that include sensitive data. In one embodiment, this policy may represent a data-loss-prevention policy aimed at protecting an organization's sensitive data.

In some examples, identification module 104 may operate as part of a service that attempts to track and/or organize an organization's unstructured data. For example, identification module 104 may operate as part of (or receive information from) a search engine that scans an organization's data for unstructured data in order to extract information about the unstructured data and/or catalog the unstructured data. In these examples, identification module 104 may identify resource 208 in response to determining, based on the results of a scan for unstructured data, that resource 208 represents unstructured data.

At step 304, one or more of the systems described herein may establish, for a resource, an accessibility threshold that indicates a limit on permissions to access the resource. For example, threshold module 106 may, as part of server 206 in FIG. 2, establish, for resource 208, an accessibility threshold that indicates a limit on permissions to access resource 208.

As used herein, a "permission to access a resource" generally refers to a rule associated with a resource that regulates which users may access the resource and in what manner the users may access the resource. For example, a permission to access a resource may refer to a permission to read the resource. A permission to read a resource may include, for example, permission to read the resource's content and/or permission to view the attributes, ownership, and/or permissions set of the resource. Additionally or alternatively, a permission to access a resource may refer to a permission to modify the resource. A permission to modify a resource may include, for example, permission to modify the resource's content, permission to overwrite the resource, permission to delete the resource, and/or permission to change the resource's attributes. Additionally or alternatively, a permission to access a resource may refer to a permission to perform management functions for the resource. A permission to perform management functions for a resource may include, for example, permission to change the permission set for the resource and/or permission to take ownership of the resource.

As used herein, the term "accessibility threshold" generally refers to a limit on permissions to access a resource. For example, an "accessibility threshold" may refer to a limit on the maximum acceptable number of users who may have permission to access a resource without triggering a security action. In another example, an "accessibility threshold" may refer to a limit on the maximum acceptable percentage change in the number of users who have permission to access a resource without triggering a security action.

Threshold module 106 may establish an accessibility threshold in a variety of ways. In some examples, threshold module 106 may indicate that a security action will be triggered if permissions to access resource 208 surpass an accessibility threshold. For example, threshold module 106 may indicate that a security action will be triggered if a current number of users (e.g., users of computing devices 212(1)-(N)) with permission to access resource 208 surpasses a predefined baseline number by more than a threshold amount.

In some embodiments, this baseline number may represent a static number. In additional or alternative embodiments, the baseline number may represent a dynamic number (e.g., a number based on an event that occurs at the time the accessibility threshold is established). For example, the baseline number may correspond to a number of users with permission to access resource 208 at a certain moment in time (e.g., at the time the accessibility threshold is established). Using FIGS. 4 and 5 as a specific example of a dynamic baseline number, threshold module 106 may determine that on Oct. 1, 2015 (e.g., a time at which an accessibility threshold for resource 208 is established), 5 users have permission to read resource 208. Based on this determination, threshold module 106 may indicate, as illustrated in threshold information 500 in FIG. 5, that the baseline number for read permissions for resource 208 is the number 5.

In some embodiments, the threshold amount may represent a static number. In these embodiments, threshold module 106 may indicate that the security action will be triggered if a current number of users with permission to access resource 208 surpasses the baseline number by more than the static number. In additional or alternative embodiments, the threshold amount may represent a predefined percentage of the baseline number. In these embodiments, threshold module 106 may indicate that the security action will be triggered if a percentage difference between a current number of users with permission to access resource 208 and the baseline number surpasses the predefined percentage.

In some examples, the baseline number and/or the threshold amount may be selected by a user, such as an administrator of an organization storing and/or managing resource 208. In other examples, the baseline number and/or the threshold amount may be automatically selected by a service that provides data management services and/or data-loss-prevention services for the organization storing resource 208.

In embodiments involving multiple types of permissions (e.g., a read permission, a modify permission, and a permission to perform management functions), threshold module 106 may indicate that a security action will be performed if permissions for any one of the permission types surpasses an accessibility threshold. As a specific example, threshold module 106 may indicate that a security action will be performed if at least one of (1) permissions to read resource 208 surpass the accessibility threshold, (2) permissions to modify resource 208 surpass the accessibility threshold, or (3) permissions to perform management functions for resource 208 surpass the accessibility threshold. Additionally or alternatively, threshold module 106 may indicate that a security action will be triggered if permissions for a threshold number of the permission types surpass the accessibility threshold (e.g., two or more of the permission types, all of the permission types, etc.). Additionally or alternatively, threshold module 106 may indicate that a security action will be triggered if permissions for a given combination of permission types surpass the accessibility threshold.

In some embodiments, threshold module 106 may establish a separate accessibility threshold for each type of permission. For example, threshold module 106 may establish a first accessibility threshold for permissions to read resource 208, a second accessibility threshold for permissions to modify resource 208, and a third accessibility threshold for permissions to perform management functions for resource 208. Using threshold information 500 in FIG. 5 as a specific example, threshold module 106 may indicate that (1) the accessibility threshold for read permissions is a 100% difference from the baseline number 10, (2) the accessibility threshold for modify permissions is a 200% difference from the baseline number 5, and (3) the accessibility threshold for managing permissions is a 50% difference from the baseline number 2. In these embodiments, threshold module 106 may indicate that a security action will be performed if any one of the accessibility thresholds is surpassed, if more than a threshold number of the accessibility thresholds are surpassed, and/or if any given combination of the accessibility thresholds are surpassed.

In some examples, threshold module 106 may not distinguish between various types of access permissions. In these examples, threshold module 106 may indicate that a security action will be triggered if a total number of users with permission to access resource 208 (or a change in the total number of users with permission to access resource 208)

surpasses the accessibility threshold, without separating the permissions based on type. Using threshold information 500 in FIG. 5 as a specific example, threshold module 106 may indicate that the accessibility threshold for the total number of access permissions is a 100% difference from the baseline number 20.

Returning to FIG. 3, at step 306, one or more of the systems described herein may monitor how the permissions to access the resource drift over time by tracking changes in users' permissions to access the resource. For example, monitoring module 108 may, as part of server 206 in FIG. 2, monitor how the permissions to access resource 208 drift over time by tracking changes in users' permissions to access resource 208.

Monitoring module 108 may track permission drifts in a variety of ways. In one example, monitoring module 108 may track changes in the number of users (e.g., users of computing devices 212(1)-(N)) who have various types of permission to access resource 208. For example, monitoring module 108 may track changes in the number of users who have permission to read resource 208. Using FIG. 4 as a specific example, monitoring module 108 may indicate, in a tracking data structure 400, that the number of users with permission to read resource 208 was (1) 5 on Oct. 1, 2015, (2) 10 on Oct. 2, 2015, (3) 5 from Oct. 3, 2015 until Oct. 4, 2015, (4) 20 from Oct. 5, 2015 until Oct. 6, 2015, (5) 15 on Oct. 6, 2015, and (6) 10 on Oct. 8, 2015.

Figure 4:
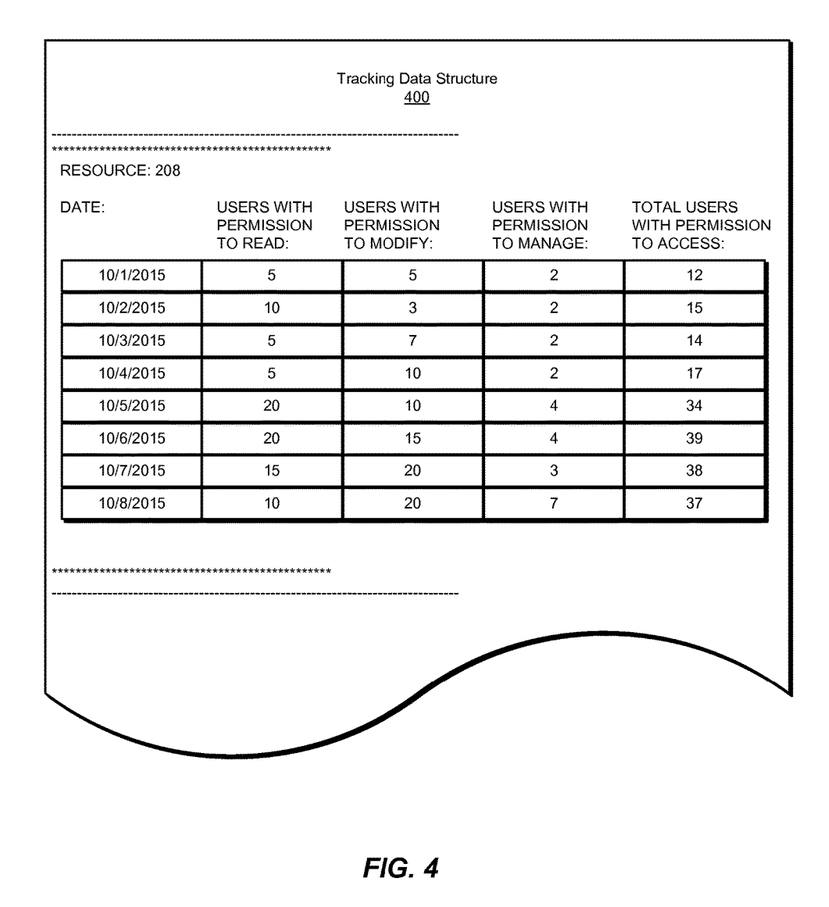
FIG. 4 is a block diagram of an exemplary tracking data structure used for protecting sensitive data against data loss.
Figure 5:
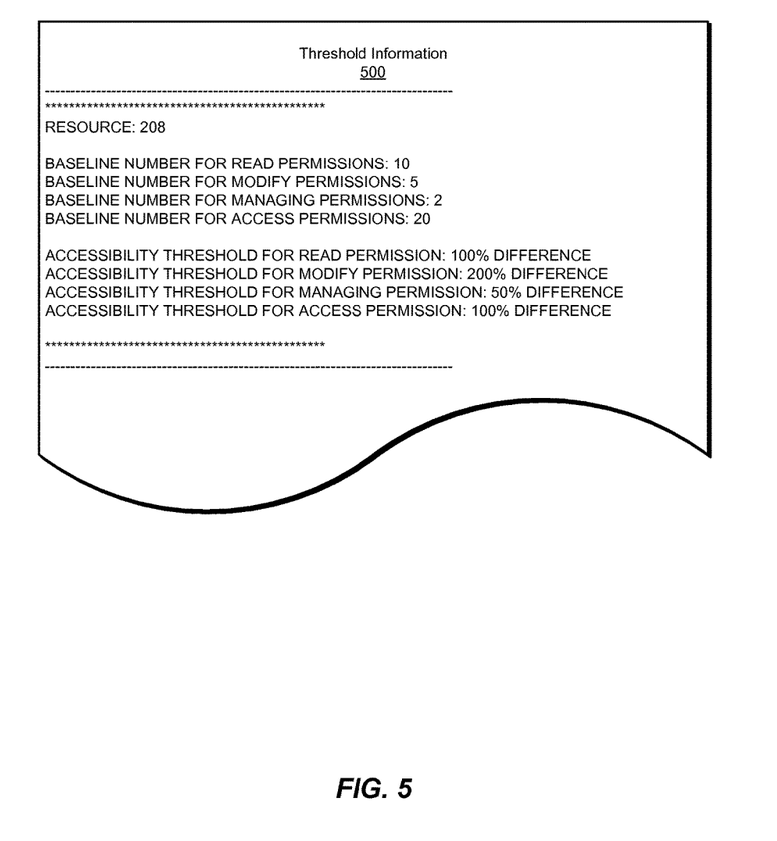
FIG. 5 is a block diagram of an exemplary data structure of threshold information used for protecting sensitive data against data loss.

As an additional or alternative example, monitoring module 108 may track changes in the number of users who have permission to modify resource 208. For example, as illustrated in FIG. 4, monitoring module 108 may indicate, in tracking data structure 400, that the number of users with permission to modify resource 208 was (1) 5 on Oct. 1, 2015, (2) 3 on Oct. 2, 2015, (3) 7 on Oct. 3, 2015, (4) 10 from Oct. 4, 2015 until Oct. 5, 2015, (5) 15 on Oct. 6, 2015, and (6) 20 from Oct. 7, 2015 until Oct. 8, 2015.

Additionally or alternatively, monitoring module 108 may track changes in the number of users who have permission to perform management functions for resource 208. For example, as illustrated in FIG. 4, monitoring module 108 may indicate, in tracking data structure 400, that the number of users with permission to perform management functions for resource 208 was (1) 2 from Oct. 1, 2015 until Oct. 4, 2014, (2) 4 from Oct. 5, 2015 until Oct. 6, 2015, (3) 3 on Oct. 7, 2015, and (4) 7 on Oct. 8, 2015.

In some embodiments, monitoring module 108 may track changes in the total number of users who have permission to access resource 208 (e.g., the combined total of the number of users with at least one of read permission, write permission, and/or permission to perform management functions). For example, as illustrated in FIG. 4, monitoring module 108 may indicate, in tracking data structure 400, that the number of users with some kind of permission to access resource 208 was (1) 12 on Oct. 1, 2015, (2) 15 on Oct. 2, 2015, (3) 14 on Oct. 3, 2015, (4) 17 on Oct. 4, 2015, (5) 34 on Oct. 5, 2015, (6) 39 on Oct. 6, 2015, (7) 38 on Oct. 7, 2015, and (8) 37 on Oct. 8, 2015.

In some examples, monitoring module 108 may track changes in the number of users who have permission to access resource 208 by tracking permission changes for resource 208. Additionally or alternatively, monitoring module 108 may track changes made to an active directory. Using FIG. 4 as a specific example, monitoring module 108 may identify, on Oct. 4, 2015, that a first group of users, which has 5 users in the group, has permission to access resource 208. Then, on Oct. 5, 2015, monitoring module 108 may determine that a second group, which has 15 users in the group, is added as part of the first group. Based on this shift, monitoring module 108 may determine that the number of users with permission to read resource 208 has increased from 5 to 20. In one example, monitoring module 108 may identify changes in the number of users with permission to access resource 208 based on information (e.g., group membership information and/or resource permissions) obtained from a directory service such as SYMANTEC ACTIVE DIRECTORY and/or NORTON INTERNET SECURITY.

Monitoring module 108 my track permission changes at a variety of frequencies. In some examples, monitoring module 108 may track permission changes every time a permission change occurs. In other examples, monitoring module 108 may track permission changes by identifying permissions at set increments of time (e.g., every minute, every hour, daily, weekly, biweekly, monthly, or based on any other increment of time).

In some embodiments, monitoring module 108 may also calculate a difference and/or a percentage difference between a baseline number (such as the baseline numbers discussed above in connection with step 304) and a number of users with permission to access resource 208 at a current moment in time. Using the tracking data in FIG. 4 and the baseline numbers in FIG. 5 as a specific example, monitoring module 108 may determine that, on Oct. 5, 2015, the difference between (1) the number of users with permission to read resource 208 (i.e., the number 20) and (2) the baseline number indicated in FIG. 5 (i.e., the number 10) is 10. Likewise, using FIGS. 4 and 5, monitoring module 108 may determine that, on Oct. 5, 2015, the percentage difference between (1) the number of users with permission to read resource 208 (i.e., the number 20) and (2) the baseline number indicated in FIG. 5 (i.e., the number 10) is 100%.

In some examples, monitoring module 108 may only consider changes in access permission that are positive. For example, monitoring module 108 may only calculate the difference and/or the percentage difference between the baseline number and the number of users at a current moment in time if the number of users at the current moment in time has positively changed relative to the baseline number. Using FIGS. 4 and 5 as a specific example, monitoring module 108 may be configured to not calculate the difference and/or percentage difference between the baseline number and the number of users with permission to read resource 208 on Oct. 3, 2015 because the number 5 (i.e., the number of users with permission to read resource 208 on Oct. 3, 2015) is less than the baseline number for read permissions (i.e., the number 10). By contrast, monitoring module 108 may be configured to calculate the difference and/or the percentage difference between the baseline number and the number of users with permission to modify resource 208 on Oct. 3, 2015 because the number 7 (i.e., the number of users with permission to modify resource 208 on Oct. 3, 2015) is greater than the baseline number for modify permissions (i.e., the number 5). By only calculating percentage differences for positive changes, the disclosed systems and methods may avoid identifying percentage differences for negative changes that may surpass a threshold amount (e.g., the accessibility threshold discussed above in connection with step 304) but, because the number of users with permission has decreased not increased, may not pose a significant security threat.

Additionally or alternatively, monitoring module 108 may only consider changes in access permission once the number of users with permission to access resource 208 exceeds a certain amount (e.g., an amount selected by an administrator). By only considering changes in access permission once the number of users with access permission exceeds a certain amount, the disclosed systems and methods may filter out alerts for resources that are unlikely to be at risk of exposure due to only a small number of users having an access permission.

At step 308, one or more of the systems described herein may detect, while tracking the changes in users' permissions to access the resource, that access to the resource has surpassed an accessibility threshold. For example, monitoring module 108 may, as part of server 206 in FIG. 2, detect, while tracking the changes in users' permissions to access resource 208, that access to resource 208 has surpassed an accessibility threshold.

Monitoring module 108 may detect that access to resource 208 has surpassed an accessibility threshold in a variety of ways. In some examples, monitoring module 108 may determine that a current number of users with a certain type of access permission for resource 208 has surpassed the accessibility threshold. For example, monitoring module 108 may determine that (1) a current number of users with permission to read resource 208, (2) a current number of users with permission to modify resource 208, and/or (3) a current number of users with permission to perform management functions for resource 208 has surpassed an accessibility threshold.

In some examples, monitoring module 108 may determine that a combination of two or more of the current number of users with permission to read the resource, the current number of users with permission to modify the resource, or the current number of users with permission to perform management functions for the resource have surpassed the accessibility threshold. For example, monitoring module 108 may determine that a current number of all users with permission to access resource 208 (e.g., a number of users who have permission to read, modify, and/or manage resource 208) has surpassed the accessibility threshold.

In some examples, as discussed above in connection with step 306, monitoring module 108 may identify a difference and/or percentage difference between a current number of users with permission to access resource 208 and a baseline number. In these examples, monitoring module 108 may determine that the identified difference and/or percentage difference exceeds a threshold amount. Using FIGS. 4 and 5 as a specific example, monitoring module 108 may determine (1) that an accessibility threshold for read permissions is a 100% difference and (2) that a percentage difference between the current number of users with read permissions on Oct. 5, 2015 (i.e., the number 20) and the baseline number for read permissions (i.e., the number 10) is 100% ((20−10)/10×100). Thus, in this specific example, monitoring module 108 may detect, based on the 100% difference on Oct. 5, 2015, that read access to resource 208 has surpassed the accessibility threshold on Oct. 5, 2015.

Returning to FIG. 3, at step 310, one or more of the systems described herein may, in response to the detection that the access to the resource has surpassed the accessibility threshold, perform a security action to protect the sensitive data from potentially being exposed. For example, security module 110 may, as part of server 206 in FIG. 2, in response to monitoring module 108 detecting that the access to resource 208 has surpassed the accessibility threshold, perform a security action to protect sensitive data 210 from potentially being exposed.

Security module 110 may perform a variety of security actions. In one example, security module 110 may send a security alert to a user. For example, security module 110 may send an alert indicating that resource 208 is potentially at risk of being exposed. In some examples, security module 110 may send an alert to an administrator that manages security of resource 208.

In one embodiment, security module 110 may block on or more of the users' access to resource 208. Additionally or alternatively, security module 110 may revoke one or more of the users' access to resource 208. Additionally or alternatively, security module 110 may limit one or more users' access to resource 208. For example, security module 110 may limit one or more users' with modify permissions and/or with management permission such that these users are only given read permissions.

In some examples, security module 110 may block, revoke, and/or limit user access permanently. In other examples, security module 110 may block, revoke, and/or limit user access temporarily (e.g., for a set amount of time). In other examples, security module 110 may block, revoke, and/or limit user access contingently (e.g., until and/or unless an administrator restores access). In some examples, security module 110 may block, revoke, and/or limit user access automatically, without waiting for direct user input to dictate the blocking, revoking and/or limiting.

Security module 110 may perform a security action in response to a variety of events. In one example, security module 110 may perform the security action in response to monitoring module 108 detecting permission drift that exceeds an acceptable amount. Additionally or alternatively, security module 110 may perform the security action in response to monitoring module 108 detecting that the number of users with permission to access resource 208 (e.g., the openness of resource 208) exceeds a certain number. Additionally or alternatively, security module 110 may perform the security action in response to identification module 104 determining that resource 208 includes sensitive data (e.g., sensitive data 210). In some examples, security module 110 may perform the security action only if (1) the permission drift exceeds the acceptable amount, (2) the openness of resource 208 exceeds the certain number, and (3) resource 208 includes sensitive data.

As discussed above, the disclosed systems and methods improve data governance by monitoring access permission drifts and responding to the access permission drifts. In some examples, the disclosed systems and methods may quantify the risk that a resource will be exposed based on (1) a drift in the number of users who have read access to the resource, (2) a drift in the number of users who have modify access to the resource, and/or (3) a drift in the number of users who have full control (e.g., management capabilities) of the resource. For example, the disclosed systems and methods may calculate a percentage change in access for each of these permission types (e.g., read, modify, and manage permissions). The disclosed systems and methods may also establish an access change threshold. In this example, the disclosed systems and methods may determine that the resource is at risk of exposure if the drift in the number of users with any one of read permission, modify permission, or management permission exceeds the access change threshold. In some examples, drifts in access numbers may only be considered once a minimum number of users start to access the resource to prevent falsely concluding that a resource with a large amount of permission drift, but overall small number of permissions, has a significant risk of data loss. Thus, by monitoring permission drifts, potential security risks created by the permission drifts may be identified and responded to.

Figure 6:
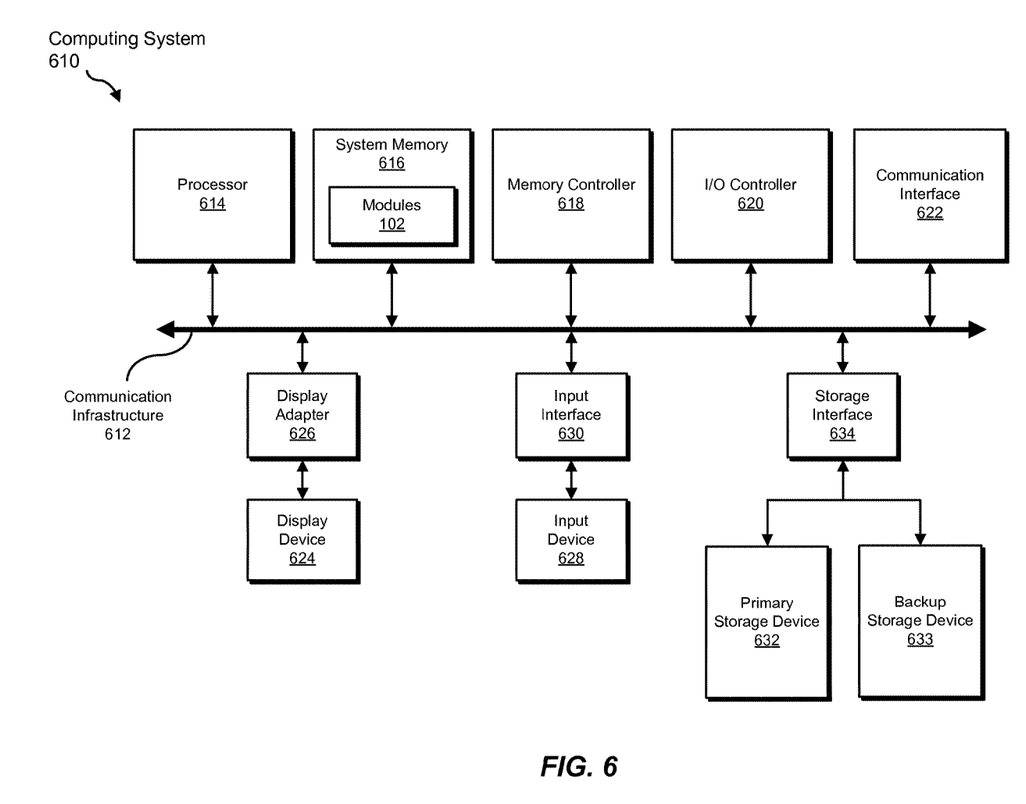
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
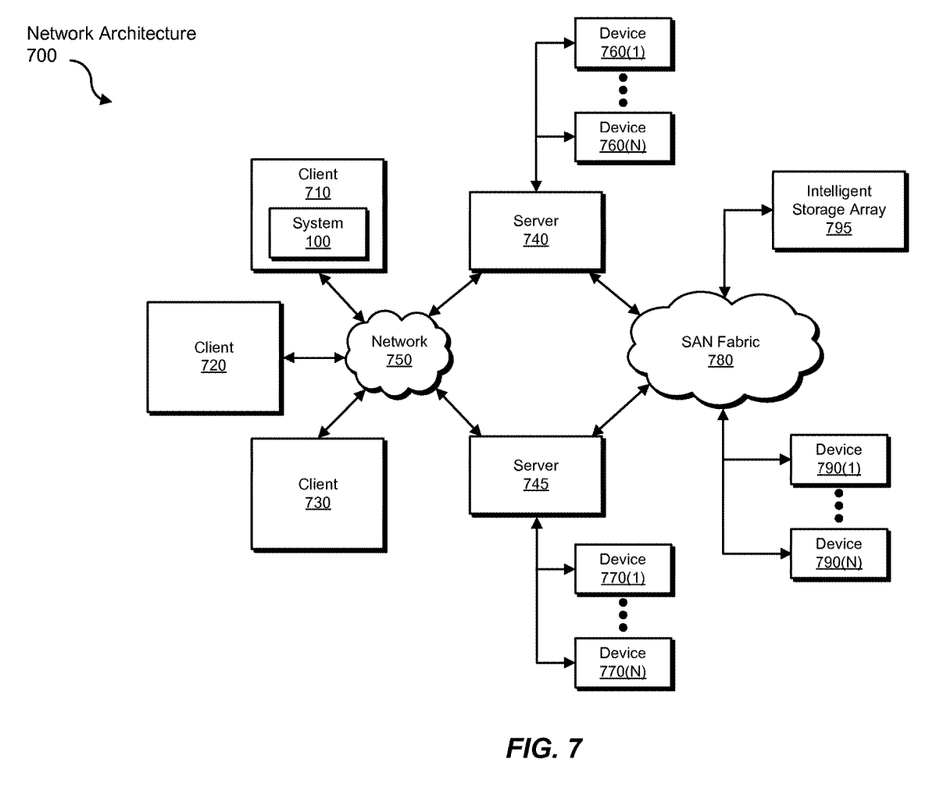
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-

(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting sensitive data against data loss.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive access permission data for a resource and transform that data into a security determination for the resource. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting sensitive data against data loss, at least a portion of the method being performed by a computing device comprising at least one processor, the method comprising:
   identifying a resource, maintained by an organization, comprising sensitive data;
   establishing, for the resource, an accessibility threshold that indicates a limit on permissions to access the resource, wherein:
      the limit on permissions comprises a limit on a total number of user accounts of users employed by the organization that have permission to access the resource;
      the accessibility threshold indicates that a security action will be triggered if a current total number of user accounts with permission to access the resource surpasses a baseline number by more than a threshold amount;
   monitoring how the permissions to access the resource drift over time by:
      identifying, based on group membership information from a directory service managed by a security service, a plurality of different subgroups within the organization, each of which has a different type of permission to access the resource;
      identifying, by adding a number of user accounts within each subgroup, a total number of user accounts that have permission to access the resource;
      based on changes to the group membership information over time, tracking changes in the total number of user accounts that have permission to access the resource;
   detecting, while tracking the changes in the total number of user accounts that have permission to access the resource over time, that the total number has surpassed the accessibility threshold;
   in response to detecting that the total number has surpassed the accessibility threshold, performing the security action to protect the sensitive data from potentially being exposed.

2. The computer-implemented method of claim 1, wherein the threshold amount comprises a predefined percentage of the baseline number.

3. The computer-implemented method of claim 1, wherein the baseline number comprises a number selected by a user.

4. The computer-implemented method of claim 1, wherein the baseline number comprises a total number of user accounts with permission to access the resource at the time the accessibility threshold is established.

5. The computer-implemented method of claim 1, wherein tracking the changes in the total number of user accounts that have permission to access the resource comprises tracking only instances in which a number of user accounts with permission to access the resource increases.

6. The computer-implemented method of claim 1, wherein the different types of permission to access the resource comprise at least one of:
   permission to read the resource;
   permission to modify the resource;
   permission to perform management functions for the resource.

7. The computer-implemented method of claim 6, wherein performing the security action comprises revoking the access of one or more user accounts to the resource.

8. The computer-implemented method of claim 1, wherein performing the security action comprises at least one of:
   sending, to an administrator that manages security of the resource, an alert indicating that the resource is potentially at risk of being exposed;
   blocking the access of one or more user accounts to the resource;
   limiting the access of one or more user accounts to the resource.

9. The computer-implemented method of claim 1, wherein identifying the resource comprises:
   scanning the organization's unstructured data for resources comprising sensitive information;
   identifying the resource as a result of the scanning.

10. The computer-implemented method of claim 1, wherein the group membership information comprises information in an active directory.

11. A system for protecting sensitive data against data loss, the system comprising:

an identification module, stored in memory, that identifies a resource, maintained by an organization, comprising sensitive data;

a threshold module, stored in memory, that establishes, for the resource, an accessibility threshold that indicates a limit on permissions to access the resource, wherein:

the limit on permissions comprises a limit on a total number of user accounts of users employed by the organization that have permission to access the resource;

the accessibility threshold indicates that a security action will be triggered if a current total number of user accounts with permission to access the resource surpasses a baseline number by more than a threshold amount;

a monitoring module, stored in memory, that:

monitors how the permissions to access the resource drift over time by:

identifying, based on group membership information from a directory service managed by a security service, a plurality of different subgroups within the organization, each of which has a different type of permission to access the resource;

identifying, by adding a number of user accounts within each subgroup, a total number of user accounts that have permission to access the resource;

based on changes to the group membership information over time, tracking changes in the total number of user accounts that have permission to access the resource;

detects, while tracking the changes in the total number of user accounts that have permission to access the resource over time that the total number has surpassed the accessibility threshold;

a security module, stored in memory, that, in response to the detection, performs the security action to protect the sensitive data from potentially being exposed;

at least one physical processor configured to execute the identification module, the threshold module, the monitoring module, and the security module.

12. The system of claim 11, wherein the threshold amount comprises a predefined percentage of the baseline number.

13. The system of claim 11, wherein the baseline number comprises a number selected by a user.

14. The system of claim 11, wherein the baseline number comprises a number of user accounts with permission to access the resource at the time the accessibility threshold is established.

15. The system of claim 11, wherein the monitoring module tracks the changes in the total number of user accounts that have permission to access the resource by tracking only instances in which a number of user accounts with permission to access the resource increases.

16. The system of claim 11, wherein the different types of permission to access the resource comprise at least one of:
permission to read the resource;
permission to modify the resource;
permission to perform management functions for the resource.

17. The system of claim 16, wherein the security module performs the security action by revoking the access of one or more user accounts to the resource.

18. The system of claim 11, wherein the security module performs the security action by at least one of:
sending, to an administrator that manages security of the resource, an alert indicating that the resource is potentially at risk of being exposed;
blocking the access of one or more user accounts to the resource;
limiting the access of one or more user accounts to the resource.

19. The system of claim 11, wherein the identification module identifies the resource by:
scanning the organization's unstructured data for resources comprising sensitive information;
identifying the resource as a result of the scanning.

20. A non-transitory computer-readable medium comprising one or more computer-readable instructions that, when executed by at least one processor of a computing device, cause the computing device to:

identify a resource, maintained by an organization, comprising sensitive data;

establish, for the resource, an accessibility threshold that indicates a limit on permissions to access the resource, wherein:

the limit on permissions comprises a limit on a total number of user accounts of users employed by the organization that have permission to access the resource;

the accessibility threshold indicates that a security action will be triggered if a current total number of user accounts with permission to access the resource surpasses a baseline number by more than a threshold amount;

monitor how the permissions to access the resource drift over time by:

identifying, based on group membership information from a directory service managed by a security service, a plurality of different subgroups within the organization, each of which has a different type of permission to access the resource;

identifying, by adding a number of user accounts within each subgroup, a total number of user accounts that have permission to access the resource;

based on changes to the group membership information over time, tracking changes in the total number of user accounts that have permission to access the resource;

detect, while tracking the changes in the total number of user accounts that have permission to access the resource over time, that the total number has surpassed the accessibility threshold;

in response to the detection, perform a security action to protect the sensitive data from potentially being exposed.

* * * * *

UNITED STATES PATENT AND TRADEMARK OFFICE
CERTIFICATE OF CORRECTION

PATENT NO. : 10,282,557 B1
APPLICATION NO. : 14/946407
DATED : May 7, 2019
INVENTOR(S) : Jitendra Pore et al.

Page 1 of 1

It is certified that error appears in the above-identified patent and that said Letters Patent is hereby corrected as shown below:

In the Claims

In Column 21, Line 35 (approx.), Claim 11, delete "over time" and insert -- over time, --, therefor.

Signed and Sealed this
Sixteenth Day of July, 2019

Andrei Iancu
*Director of the United States Patent and Trademark Office*